US007617446B2

(12) United States Patent
Dutta

(10) Patent No.: US 7,617,446 B2
(45) Date of Patent: Nov. 10, 2009

(54) METHOD AND SYSTEM FOR PRE-PRINT PROCESSING OF WEB-BASED DOCUMENTS TO REDUCE PRINTING COSTS

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 09/817,090

(22) Filed: Mar. 26, 2001

(65) Prior Publication Data

US 2002/0135800 A1      Sep. 26, 2002

(51) Int. Cl.
*G06F 17/00* (2006.01)
(52) U.S. Cl. ...................................... 715/234; 358/1.15
(58) Field of Classification Search ................. 715/526, 715/513, 234, 273, 236; 358/1.12, 1.9, 1.13, 358/405, 1.15
See application file for complete search history.

(56) References Cited

U.S. PATENT DOCUMENTS

| | | | | |
|---|---|---|---|---|
| 5,872,638 A * | 2/1999 | Haze | .......................... | 358/405 |
| 5,872,897 A * | 2/1999 | Jones et al. | .................. | 358/1.9 |
| 5,889,595 A * | 3/1999 | Kim et al. | ................... | 358/437 |
| 6,023,714 A * | 2/2000 | Hill et al. | ..................... | 715/513 |
| 6,122,657 A * | 9/2000 | Hoffman et al. | ............ | 709/201 |
| 6,185,588 B1 * | 2/2001 | Olson-Williams et al. | ... | 715/236 |
| 6,343,194 B1 * | 1/2002 | Shimada | ....................... | 399/28 |
| 6,348,980 B1 * | 2/2002 | Cullen et al. | ................. | 358/1.9 |
| 6,501,556 B1 * | 12/2002 | Nishii | ........................ | 358/1.12 |
| 6,560,621 B2 * | 5/2003 | Barile | ........................ | 715/513 |
| 6,582,475 B2 * | 6/2003 | Graham et al. | .............. | 715/234 |
| 6,608,698 B1 * | 8/2003 | Lyons et al. | ................. | 358/1.2 |
| 6,721,065 B1 * | 4/2004 | Kermani | ..................... | 358/1.9 |
| 6,757,071 B1 * | 6/2004 | Goodman et al. | .......... | 358/1.13 |
| 6,761,422 B2 * | 7/2004 | Smith, II | ....................... | 347/5 |
| 6,762,771 B1 * | 7/2004 | Niki et al. | ................... | 345/700 |

OTHER PUBLICATIONS 5-star shareware, "FinePrint Web (for Windows 95/98) build 22", Aug. 8, 2000, http://www.5-starshareware.com/Utilities/Printing-Utilities/finprint-web98.html.*

(Continued)

*Primary Examiner*—Doug Hutton
*Assistant Examiner*—James H Blackwell
(74) *Attorney, Agent, or Firm*—Hamilton & Terrile, LLP; Michael Rocco Cannatti

(57) ABSTRACT

The present invention is directed to a method, apparatus, system, or computer program product that allows a user to choose one or more print options within a browser environment in order to conserve the consumption of physical resources, such as paper and printer ink, by modifying the content of a document. Web-based documents are generally printed for specific, limited purposes, and hardcopy versions of Web-based documents can be relatively expensive. By utilizing the extensible nature of browser applications and the standard formatting of structured documents on the World Wide Web, a methodology is provided for reducing the consumption of printing supplies in order to reduce printing costs of relatively expensive printouts of Web-based documents. By parsing the document and changing the structure, tags, elements, element attribute values, text, graphics, etc., of the document, the present invention creates a modified document that consumes less physical resources during the physical printing process.

17 Claims, 8 Drawing Sheets

OTHER PUBLICATIONS

FinePrint Software, "FinePrint web pages", Feb. 29, 2000 downloaded from "http://web.archive.org/web/20000301150537/www.singletrack.com/index.html, features.html, press.html", Nov. 8, 2004.*

Bickmore et al., "Digestor:Device-independent Access to the World Wide Web", FX Palo Alto Lab, Xerox, Mar. 24, 2000, downloaded from http://decweb.ethz.ch/WWW6/Technical/Paper177/Paper177.html.*

MacMagic, "MacMagic web site", downloaded from http://www.macease.com/macmagic_main_page.html Oct. 14, 2004, used for background only.*

M. Brown et al.,"Using Netscape Communicator 4, Special Edition," Copyright 1997, Que Corporation, pp. 115-117.*

Collins, "XPToolkit Architecture", http://www.mozilla.org/xpfe/aom/AOM.html, Mar. 5, 1999.

Waters et al., "Internet and Intranet Printing", http://www.w3.org, Printing/iiprint.html.

Chase, "Towards Quality Printing of Web Documents", http://www.w3.org/Printing/chase.html, Apr. 1996.

Mutz et al., "Optimizing Printing Output for the Web", http://www.w3.org/Printing/mutz-hjlee.html, Apr. 1996.

"Printing Help for Java Developers", http://jsp4c.java.sun.com/printing/whitepaper.html, Jan. 2001.

JSR #000006: Unified Printing API (Java Print Service API), http://java.sun.com/aboutJava/communityprocess/jsr/jsr_006_print.html, Oct. 17, 2000.

"The Java Print Service API (JPS API)", http://java.sun.com/aboutJava/communityprocess/review/jsr006/jsr06_overview.html, Oct. 2000.

Wildstrom, "Giving the Office Printer a Touch of Color", *BusinessWeek*, Sep. 21, 1998.

Burrows, "Lew Platt's Fix-It Plan for Hewlett-Packard", *BusinessWeek*, Jul. 13, 1998.

* cited by examiner

FILTERED
DOCUMENT
556

*FIG. 5B*

The user experience // The iceberg analogy of usability  
Dick Berry // User Experience Design, IBM Ease of Use Team // October 2000 ⟩552

In his first column *****⟩560

Developers sometimes ask which aspects of look and feel contribute most to the overall usability of an application or Web site. They are typically surprised when I answer that the "look and feel" aspects aren't the major contributors at all. Look and feel have been popular discussion topics for many years and some developers have proposed various schemes purporting to allow an easy swap of one look and feel for another. ***** ⟩558

While this analogy was developed through analysis and years of experience in designing graphical user interfaces (GUI's), the basic premise concerning the importance of concepts applies equally well to the design of Web sites. While some interface aspects may be weighted differently, the evolution of Web-based applications is reestablishing the applicability of this view.

Aspects of interface usability ⟩554  
Let's examine the interface aspects that contribute to usability, and the role of look and feel. The usability of an interface can be analyzed by identifying three sets of aspects: look, feel, and the user model, as shown in Figure 1. The look includes aspects such as visual cues, feedback, and esthetics. ***** ⟩558

========================================================= ⟩566  
Figure 1. The user model outweighs look and feel in the usability of an interface The user model ⟩556  
The user model consists of aspects related to what the user is trying to accomplish, or in other words, the user's task goals. Continuing the language analogy, these goal-related aspects represent the semantics. They convey meaning in the conversation between the user and the system. *****⟩558

A user model is typically described in terms of user objects, the behaviors and properties of those objects, and their interrelationships.

562⟨

564

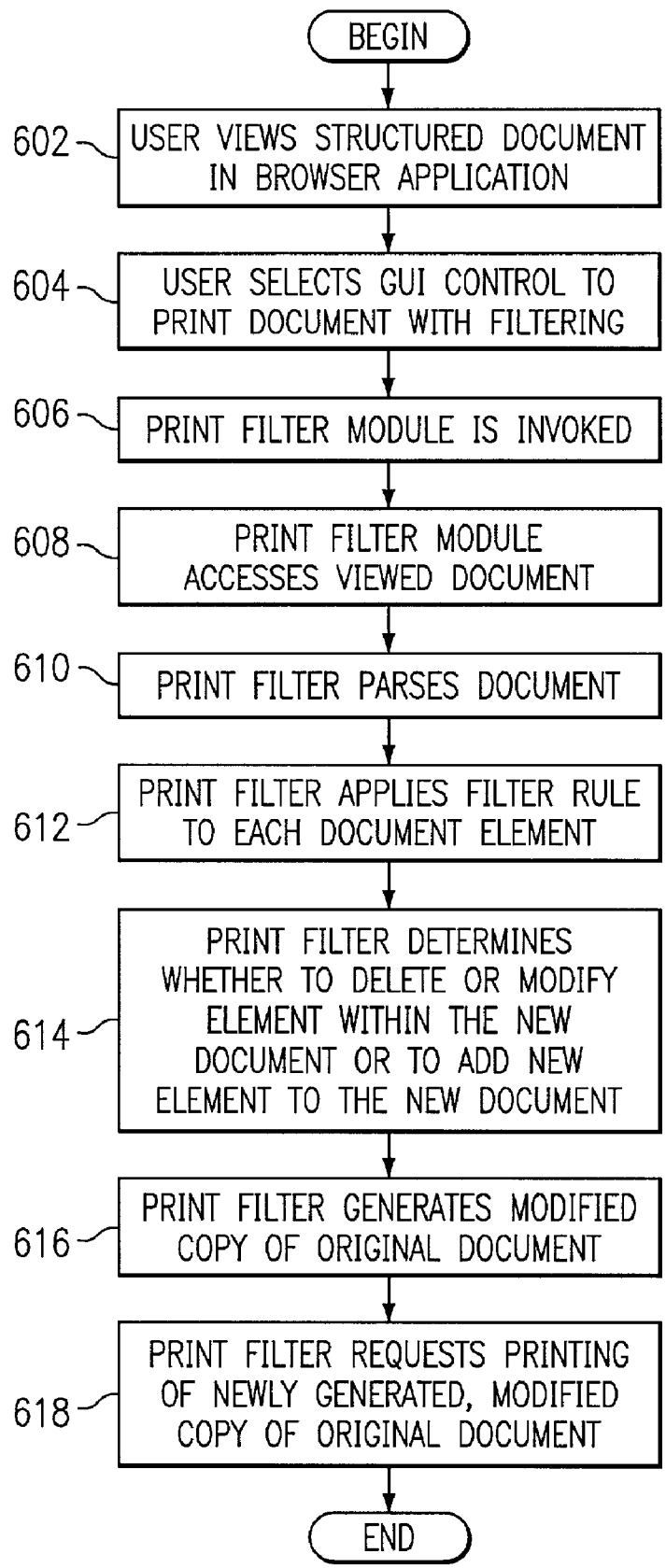

METHOD AND SYSTEM FOR PRE-PRINT PROCESSING OF WEB-BASED DOCUMENTS TO REDUCE PRINTING COSTS

BACKGROUND OF THE INVENTION

1. Field of the Invention

The present invention relates to an improved data processing system and, in particular, to a method and system for processing structured documents. Still more particularly, the present invention provides a method and system for pre-print processing of structured documents.

2. Description of Related Art

The desktop publishing industry developed as personal computers became common business tools during the 1980's. Desktop publishing software allowed businesses to create documents with in-house personnel that appeared as if they were produced by professional designers. The availability of laser printers, color printers, and color copiers along with personal computers fostered an environment in which businesses demanded better software and hardware to produce more complex and more colorful publications.

Early in the development of the desktop publishing industry, it was well-known that the presentation space of a computer monitor had different characteristics than the presentation space of a computer printer, which is still currently true. In other words, each physical device has its own resolution, color space, and rendering capabilities.

The creator of a document requires the ability to accurately layout the document on a computer monitor. When attempting to layout a document that will eventually be printed, if one chooses a particular, esthetic, design parameter for a given document based on its appeal on a computer monitor, the parameter may not be able to be reproduced in the same manner on both a computer monitor and a computer printer because the monitor and the print have different presentation capabilities. This contention between display capabilities and printer capabilities has been addressed by desktop publishing software through a variety of solutions, although every solution entails some type of tradeoff between advantages and disadvantages.

To measure the tradeoffs, the concept of WYSIWYG was developed to measure the ability of a document to be laid out in a "What You See Is What You Get" manner, i.e., what is seen on the screen is what will also be seen when printed. Word processing programs can be considered to be a type of desktop publishing application, and most word processing programs currently provide excellent document processing capabilities such that average users of personal computers do not need to worry about WYSIWYG issues.

Recently, Web browsers have become a primary tool for accessing published information. Enterprises and individuals put significant effort into designing Web pages that include graphics, animation, and esthetic layouts, and these Web pages are generally designed to be viewed on a computer screen. Many word processing programs are currently being updated to provide functionality to publish documents in the latest structured document formats, including markup language formats such as HTML (Hypertext Markup Language) and XML (eXtensible Markup Language), so that average users can easily publish documents on the World Wide Web.

Before the development of the World Wide Web, almost all complex publications were designed to be viewed in printed form. Typically, only persons who designed newsletters and other documents with complex layout requirements were concerned with WYSIWYG issues. With the widespread use of the World Wide Web and the growing number of tools to publish documents in an electronic, softcopy form, however, many documents are now being published that are intended to be viewed both in softcopy format on a computer display and in hardcopy format on a computer printer. Hence, many more people have become concerned with WYSIWYG issues, and the contention between display capabilities and printer capabilities has become a much more prominent issue.

In the context of Web browser applications and Web-based documents, the contention between the differences in displaying and printing a Web-based document is currently being solved through a variety of approaches. As one example, an author may create two versions of a Web-based document and then link the two versions together. A first Web page, coded in a markup language, is published within a Web site for general viewing on a computer display by a browser, but the first Web page contains a hyperlink to a second document that has been optimized for printing. The second document, most likely, is also coded in a markup language and is a text-only version of the first Web page, but the second document could possibly be a document in a native format that provides more control of the appearance of a hardcopy version of the document, such as an Adobe® PDF (Portable Document Format) file. This type of solution obviously complicates the publication process because an author potentially must generate two different documents for each Web page.

As another example of controlling different presentations of a document on a display versus a printer, style sheets have been promulgated for separating the style of presentation of a document from the content of a document. Different, media specific styles sheets can be applied against a document such that the document would contain the same content but appear differently when rendered on two different media. In a related manner, media-specific, markup language tags could be used to code different elements within a markup language document such that the elements of the document are rendered differently upon different media. These solutions are rather flexible and could be based on open standards, and the author of a document retains control of the manner in which a document is displayed versus the manner in which it is printed because the control mechanisms are embedded within one or more documents. While it may be important in certain circumstances to ensure that an author retains control of the manner in which a document is presented, a person who is viewing the document has no control over desired changes in the manner in which the document is printed.

As can be seen from the above description, significant efforts have been directed to display-versus-print issues. However, most of these approaches are concerned with providing true WYSIWYG capabilities, i.e., printing a hardcopy of a document that is an accurate approximation of the softcopy of the same document as presented on a computer display. Some of these solutions recognize that some Web-based documents include objects that cannot be replicated in hardcopy versions of the documents, but these solutions still attempt to provide an accurate replication of the softcopy version of a document.

In some circumstances, though, a user does not want an accurate replication and would rather have a close approximation, thereby taking advantage of the fact that a printer can generate a hardcopy of a document that is slightly different from a softcopy of the same document. In very limited circumstances, an application may allow a user to select printing options such that the hardcopy of a document will deviate from the softcopy of the document in specific ways. For example, as shown in FIG. 1A, Netscape Navigator version 4.76 provides dialog box 10 with check boxes 12 and 14 for choosing an option to print all text in black or to print all lines in black, respectively. These options presumably increase the readability of colored text and the legibility of colored lines against color backgrounds, which may be apparent on a computer display but not on a hardcopy printout. Another example, as shown FIG. 1B, Lotus WordPro version 9.5 provides dialog box 20 with check box 22 for choosing an option to print a document without pictures. This option presumably reduces the amount of time required to print a document by skipping the graphics contained within the document.

In addition, printer drivers have long allowed a user to select options that degrade or enhance the quality of a hardcopy. Most printer drivers allow a user to select discrete values within an output quality range, such as "Fast:Normal: Best" or "Draft:Better:Best", and in response, the printer driver renders an image for delivery to the printing device in accordance with the selected option. In most instances, the printer driver varies the output quality by changing the resolution at which it renders graphics and characters. More importantly, the user generally chooses lower quality output for a temporal advantage because lower quality output generally prints much faster than the best quality output. For example, FIG. 1C shows dialog box 30 for a printer driver that contains radio button 32 for choosing "Faster Printing" as a "Print Quality" option.

An important point to notice about the issue of hardcopy output versus softcopy output is that the proliferation of electronic publishing has not decreased the use of paper and printers. Rather than moving toward a paperless office environment, it appears that the Web has helped to perpetuate the widespread reliance on paper. Most enterprises will continue to provide resources for physical output of documents at least until the power of desktop computers has been significantly enhanced to include more convenient and user friendly input methods and document processing software.

The need for paper versions of softcopy documents has not abated. Meanwhile, solutions to display-versus-print issues have generally revolved around specific issues concerning WYSIWYG problems or concerning the provision of high quality output with both computer monitors and computer printers.

However, as noted above with respect to printer drivers, computer users do not always require high quality hardcopies, particularly when using a Web browser. In fact, many users make hardcopies of Web pages merely for temporary purposes or for approximate record-keeping purposes. For example, given the expansive nature of the World Wide Web, an active Web user might visit many Web sites per day, and it can be difficult to keep track of various Web sites. Although a user may bookmark a Web site, a user might generate a hardcopy version of a Web page as a short-term, physical reminder to revisit the Web page or for some other purpose. In other cases, a user might print out an entire Web page, which could result in the printing of several sheets of paper with many graphic objects, merely to capture a few paragraphs of text for record-keeping purposes or some other purpose.

In addition, some users are conscious of the fact that printing a document may cost on the order of a few cents to several cents per page based on the cost of paper, printer toner, printer ink, printer maintenance, and the original cost of the printer. The cost to print a color document is generally regarded as several cents per average page, and the cost to print a page, whether in color or in solitary black, rises significantly if the page has more content that covers more space on the sheet of paper, thereby requiring significantly more ink or toner. Given that Web-based documents are frequently filled with colorful text and colorful graphics, the cost to print a single page from a Web-based document, even if printed in solitary black, can be much higher than printing a page from a simple text document that has been produced by a word processing program. When these costs are considered over thousands of pages during a calendar year, significant savings could be realized by minimizing printing costs, yet current applications have not addressed the desire of some users to generate hardcopy versions of Web-based documents in a low cost manner.

Referring again to FIG. 1C, dialog box 30 contains checkbox 34 that represents a user-configurable print option, "EconoMode (Save Toner)", to reduce the consumption of printer toner. While FIG. 1C provides one example of a printer driver that addresses the need to save printer toner, the method in that example, however, merely reduces printer toner across an entire hardcopy without regard to the content of the document that is being printed. Although the reduction of toner across the hardcopy will be uniform, certain sections or objects on the hardcopy may be responsible for most of the consumption of toner or ink. The user that requests the hardcopy may not be interested in printing out some of these sections or objects, yet the user has no control over the inclusion of these sections or objects without editing the softcopy version of the document. While a user might be able to reduce printing costs by editing a document to simplify or reduce its content prior to printing the document, in the case of Web-based documents, browser applications are designed to provide viewing functionality with very limited editing functionality. Moreover, it would be counterproductive to require the user to exert any effort to edit a document if the user's purpose in doing so is the desire to save time and money in printing costs, particularly over a large number of documents.

Therefore, it would be advantageous to provide a methodology that, if requested by a user, automatically modifies a document prior to printing the document, e.g., by reducing content within the document, for the specific purpose of reducing the consumption of physical resources associated with the printing process, thereby reducing printing costs.

In the prior art, applications that request printouts of documents have had both limited abilities and limited purposes for changing the printed version of an electronic document. Typically, the printer driver is given the task of producing a printed version of a document that differs in some ways from the displayed version of the document. In limited circumstances, printer drivers have had the ability to produce a hardcopy in accordance with a print option that requests the conservation of printer toner. Hence, it would seem logical to provide a printer driver with functionality to reduce the content of a document prior to generating a hardcopy of the document.

However, a logical division exists between the duties of a printer driver and an application for which the printer driver prints a document. Printer drivers are concerned with accepting a document, preparing a print job for the document within the presentation space of the printing device, possibly rendering the document within that presentation space, and then transmitting the appropriate information to the printing device. In contrast, applications are concerned with presenting and possibly modifying an electronic version of a document and then requesting the printing of a hardcopy version of the document. It is widely assumed by users and application developers that any changes to the content of a document shall be performed only within the processes of an appropriate application and not within the processes of a printer driver.

Hence, it would not be appropriate to create and deploy a print driver with built-in, content-reduction, functionality. Moreover, a user would probably not desire to automatically reduce the content of printed documents across multiple applications, as would occur with use of a printer driver, because some applications are specifically designed for generating documents in a WYSIWYG manner. As noted above, however, there is a specific need by some users to generate hardcopy versions of Web-based documents in a low cost manner.

Therefore, it would be advantageous to provide a method or system for allowing a user to set printer options such that hardcopies of documents being viewed within a Web-browsing environment are generated in a low cost manner. It would be particularly advantageous to provide pre-print processing of structured documents prior to generating a hardcopy of the document that has been requested by a user of a browser application.

SUMMARY OF THE INVENTION

The present invention is directed to a method, an apparatus, a system, or a computer program product that allows a user to choose one or more print options in order to conserve the consumption of physical resources, such as paper and printer ink, by modifying the content of a document. Web-based documents are generally printed for specific, limited purposes, and hardcopy versions of Web-based documents can be relatively expensive. By utilizing the extensible nature of browser applications and the standard formatting of structured documents on the World Wide Web, a methodology is provided for reducing the consumption of printing supplies in order to reduce printing costs of relatively expensive printouts of Web-based documents. By parsing the document and changing the structure, tags, elements, element attribute values, text, graphics, etc., of the document, the present invention creates a modified document that consumes less physical resources during the physical printing process than would the physical printing process of the unmodified document. Although the resulting hardcopy may be only a roughly approximate version of the original document, the user obtains representative hardcopies for particular purposes while minimizing the printing costs, thereby potentially saving significant amounts of paper and/or printer ink or printer toner.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 5B is a diagram depicting a modified structured document that has been generated by a print filter using user-configured print options in accordance with the present invention; and FIG. 6 is a flowchart depicting a process by which a print filter module generates a hardcopy version of a structured document with content that has been modified from the original version of the structured document so as to consume less physical resources during the printing process than a hardcopy version of the original document.

DETAILED DESCRIPTION OF THE INVENTION

Figure 1A:
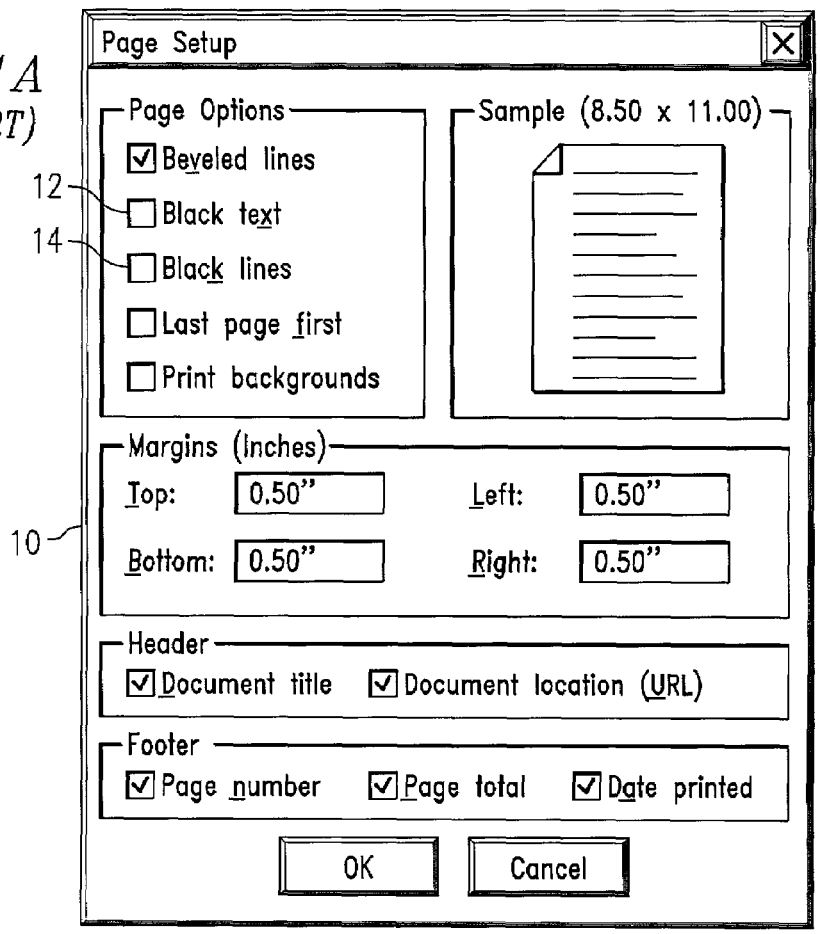
FIG. 1A depicts a Page Setup dialog box within a known browser application.
Figure 1B:
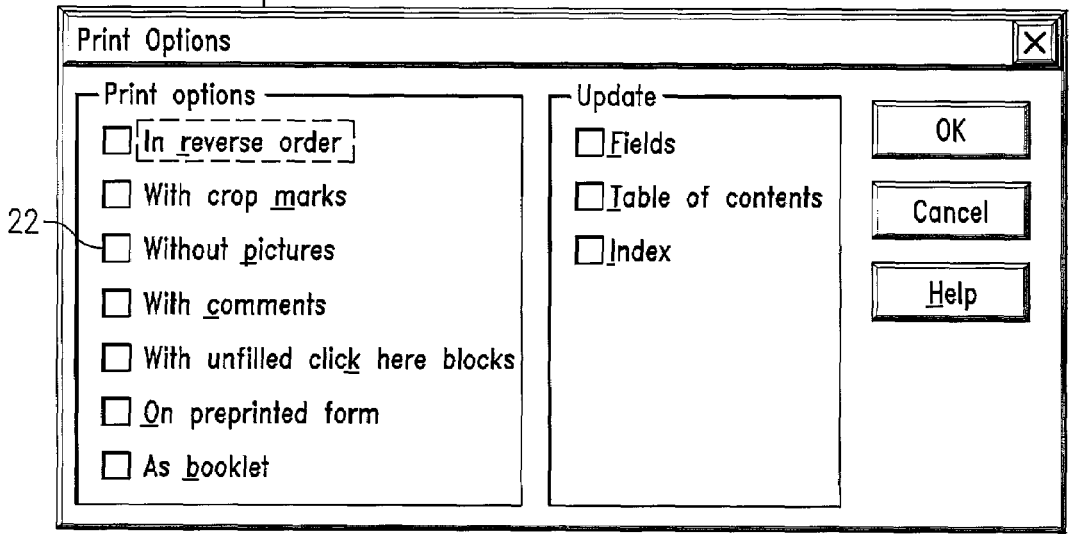
FIG. 1B depicts a Print Options dialog box within a known word processing application.
Figure 1C:
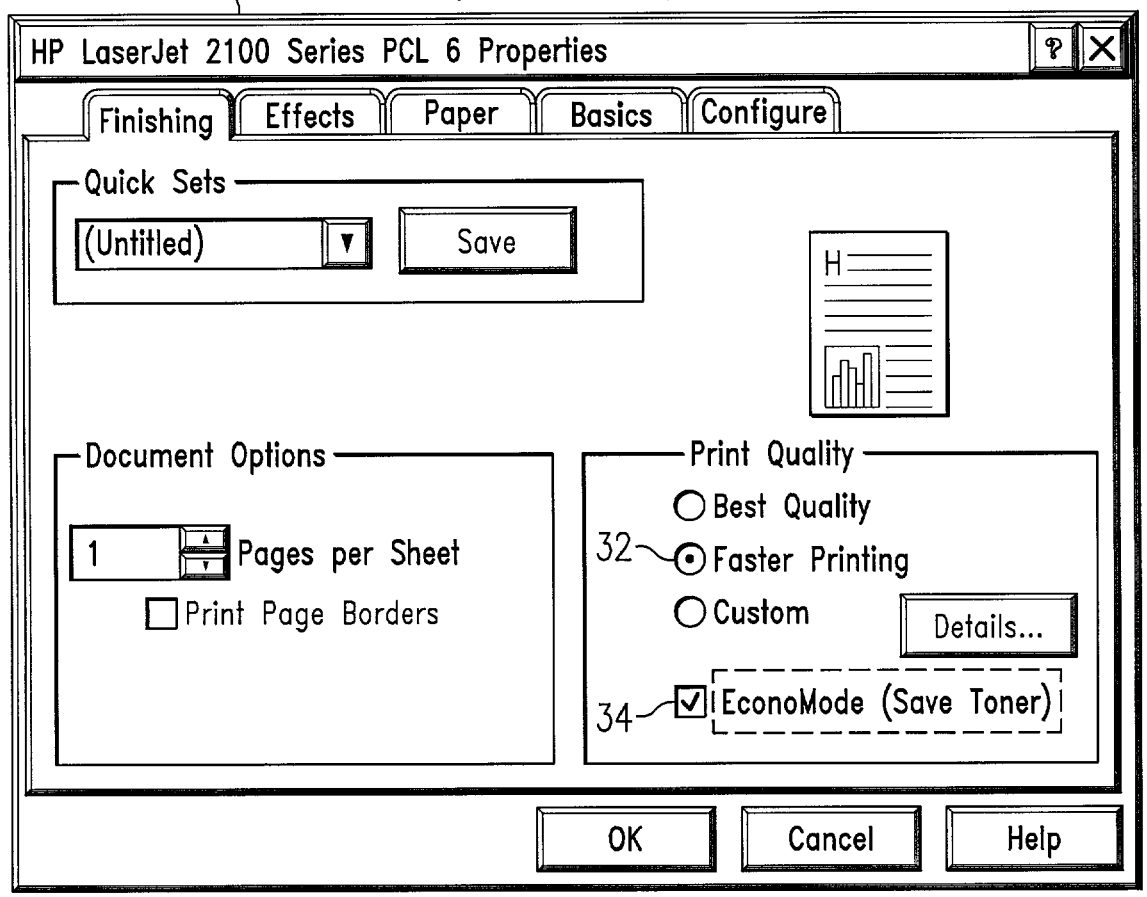
FIG. 1C depicts a dialog box within a known print driver.
Figure 1D:
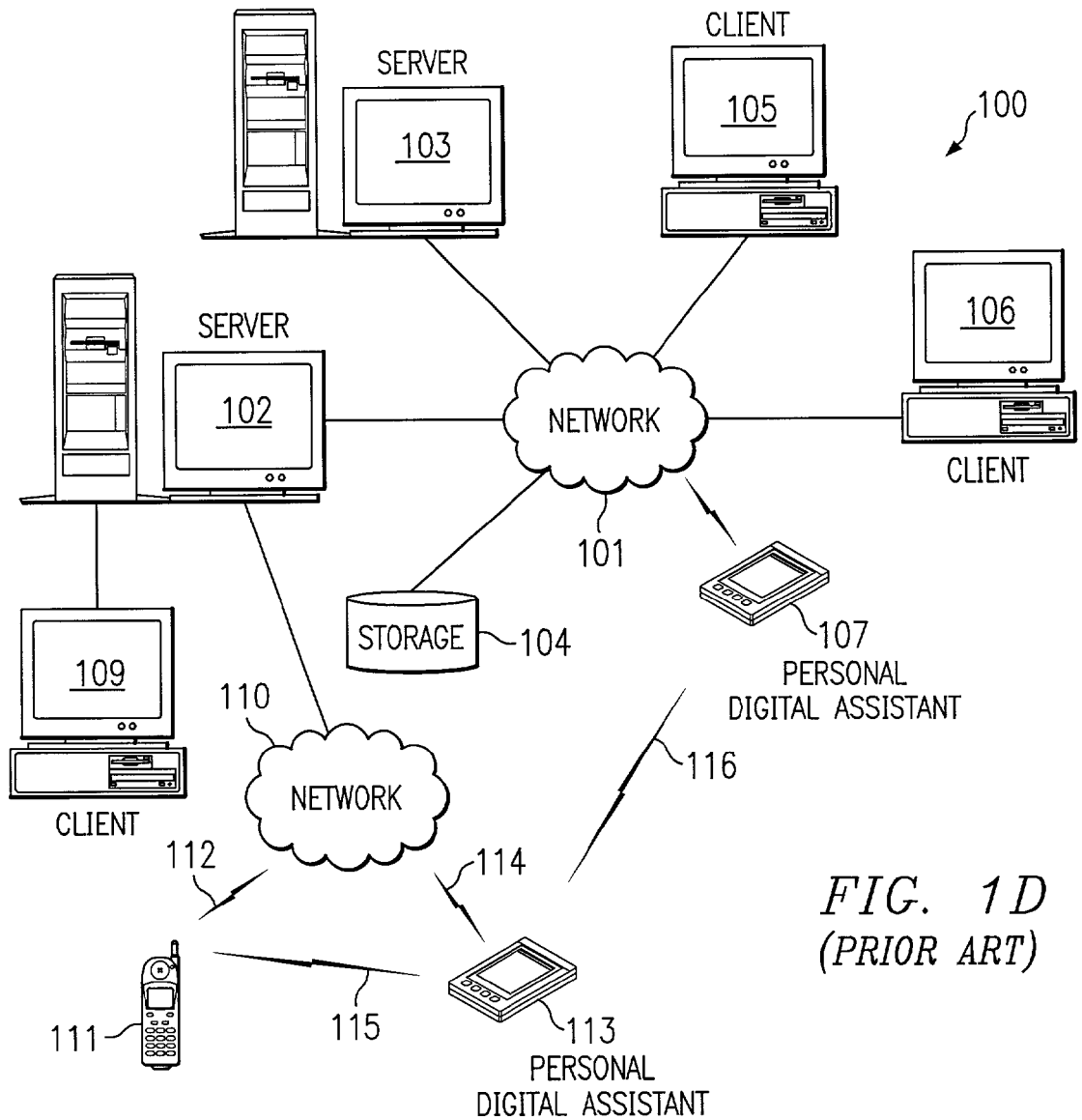
FIG. 1D depicts a typical distributed data processing system in which the present invention may be implemented.

With reference now to the figures, FIG. 1D depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks or personal ad-hoc networks. In a similar manner, PDA 113 can transfer data to PDA 107 via wireless communication link 116.

The present invention could be implemented on a variety of hardware platforms; FIG. 1D is intended as an example of a heterogeneous computing environment and not as an architectural limitation for the present invention.

Figure 1E:
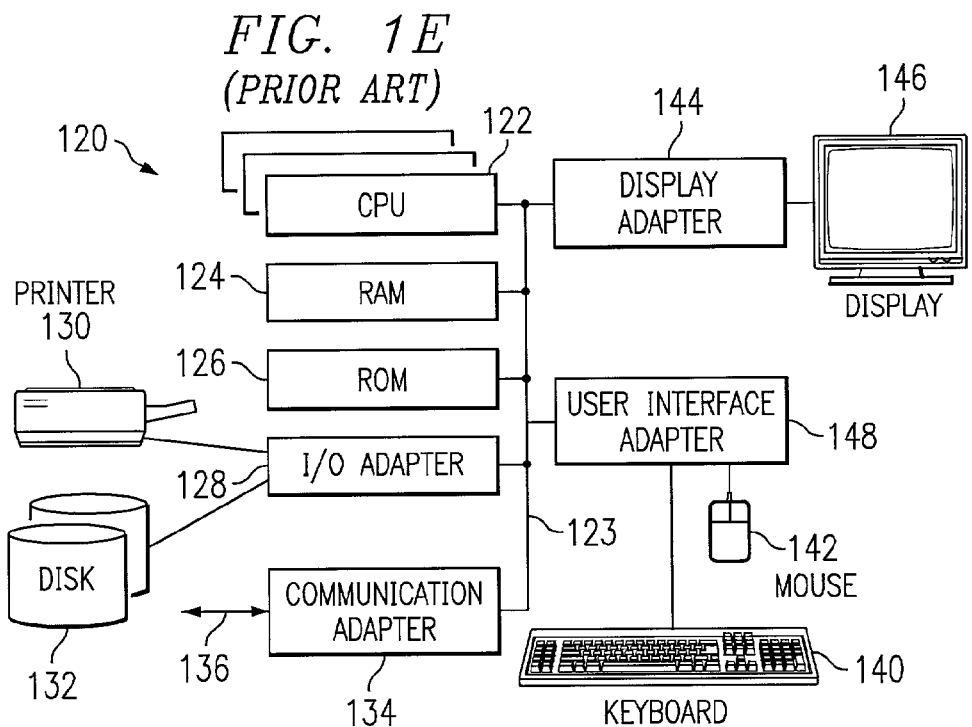
FIG. 1E depicts a typical computer architecture that may be used within a data processing system in which the present invention may be implemented.

With reference now to FIG. 1E, a diagram depicts a typical computer architecture of a data processing system, such as those shown in FIG. 1D, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a sound system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1E may vary depending on the system implementation. For example, the system may have one or more processors and one or more types of non-volatile memory. Other peripheral devices may be used in addition to or in place of the hardware depicted in FIG. 1E. In other words, one of ordinary skill in the art would not expect to find similar components or architectures within a network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix™ operating system, while another device contains a simple Java™ runtime environment. A representative computer platform may include a browser, which is a well known software application for accessing documents in a variety of formats, such as graphic files, word processing files, and structured documents formatted with extensible Markup Language (XML), Hypertext Markup Language (HTML), Handheld Device Markup Language (HDML), Wireless Markup Language (WML), and various other types of markup languages and page description languages (PDLs).

The present invention may be implemented on a variety of hardware and software platforms, as described above. More specifically, though, the present invention is directed to providing a method and system for reducing the consumption of printing supplies in order to reduce printing costs of relatively expensive printouts of Web-based documents. As background, a known software architecture for a browser application and a known client proxy with a content filter are described before describing the present invention in more detail.

Figure 2A:
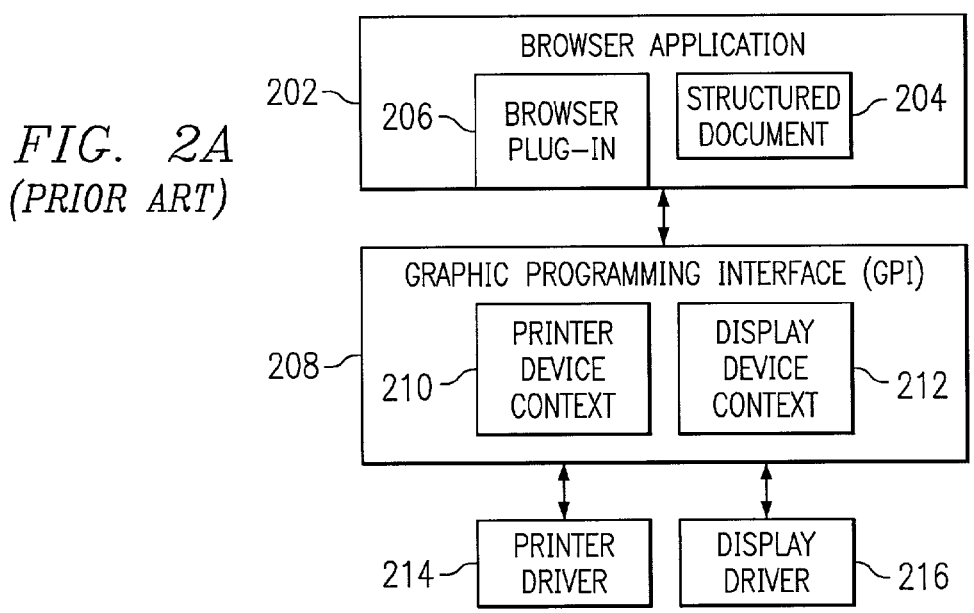
FIG. 2A is a block diagram depicting a known software architecture for a browser application.

With reference now to FIG. 2A, a block diagram depicts a known software architecture for a browser application. Browser application 202 on a client machine retrieves structured document 204 from a Web server at the request of a user of the browser application. The browser application may be responsible for processing and rendering the structured document on a computer monitor so that it may be displayed to the user, but depending on the objects within the structured document, the browser application may not include the required logic for processing an object of a special type. Typically, browser applications have extensible architectures that allow the use of plug-ins that provide functionality in modular forms. Hence, browser plug-in 206 may be required to render objects of a specific type within a browser window.

In general, software applications do not render objects directly into video memory. Browser application 202, including browser plug-in 206 if necessary, employs functions within graphic programming interface (GPI) 208 for assistance in displaying information on a specific media. GPI 208 is provided by the operating system running on the client computer and represents a set of application programming interfaces (APIs) through which applications and other operating system functions can invoke functions for performing certain actions, such as presenting graphical user interface (GUI) objects on a computer display.

An application may need to present information on more than one type of media. GPI 208 supports printer device context 210 that contains information about data objects, graphical objects, and operating system information for rendering information within the presentation space of a printer, such as the printer attached to the client computer. GPI 208 also supports display device context 212 that contains information about data objects, graphical objects, and operating system information for rendering information within the presentation space of a display device, such as the computer monitor attached to the client computer. Eventually, printer driver 214 uses printer device context 210 to obtain information to be forwarded to the printer, while display driver 216 uses display device context 212 to obtain information to be forwarded to the computer monitor.

Browser application 202 uses operating system functions to display one or more application windows with GUI controls such that a user can view structured documents. At some point in time, in a well-known manner, the user would use a print control within the browser application to request a hardcopy of the document being viewed. The browser application would then request a print job that generates a hardcopy of the document.

Figure 2B:
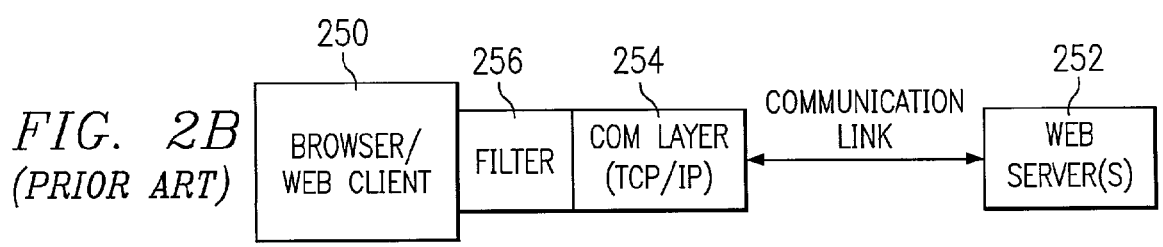
FIG. 2B is a block diagram depicting a known client proxy with a content filter.

With reference now to FIG. 2B, a block diagram depicts a known client proxy with a content filter. The components in FIG. 2B are similar to those described in Hoffman, Jr. et al., U.S. Pat. No. 6,122,657, "Internet Computer System with Methods for Dynamic Filtering of Hypertext Tags and Content", issued Sep. 19, 2000. Web client 250 is engaged in a communication session with one or more Web servers 252 across a communication link, such as an Internet or intranet connection. Client 250 comprises a Web browser or microbrowser application which communicates with the Web server through communication layer 254, such as Microsoft Winsock (Winsock .dll), which is a Microsoft Windows implementation of TCP/IP. Filter module 256 is functionally interposed between the browser or other client application for trapping and processing all communication between an application and the communication layer.

As the Web browser generates requests for content in order to retrieve a base Web page and its embedded or referenced objects, such as bitmaps or other graphic objects, the system issues HTTP commands or "methods", such as "GET" commands, which are communicated to the Web server via the communications layer and communications link. However, all outgoing commands are trapped by the filter module, which can modify or delete the command, generate new commands, and allow the command to pass unmodified.

In addition, the filter module receives all incoming content from the Web server, which allows the filter module to identify elements within the content of the Web page and then perform some type of processing on the elements prior to forwarding the elements to the browser application. For example, if the structured document is a markup language document, then the filter can modify markup tags or the attributes within the markup tags, add markup tags, delete markup tags, and more generally modify, add, or delete elements within the document.

Figure 3:
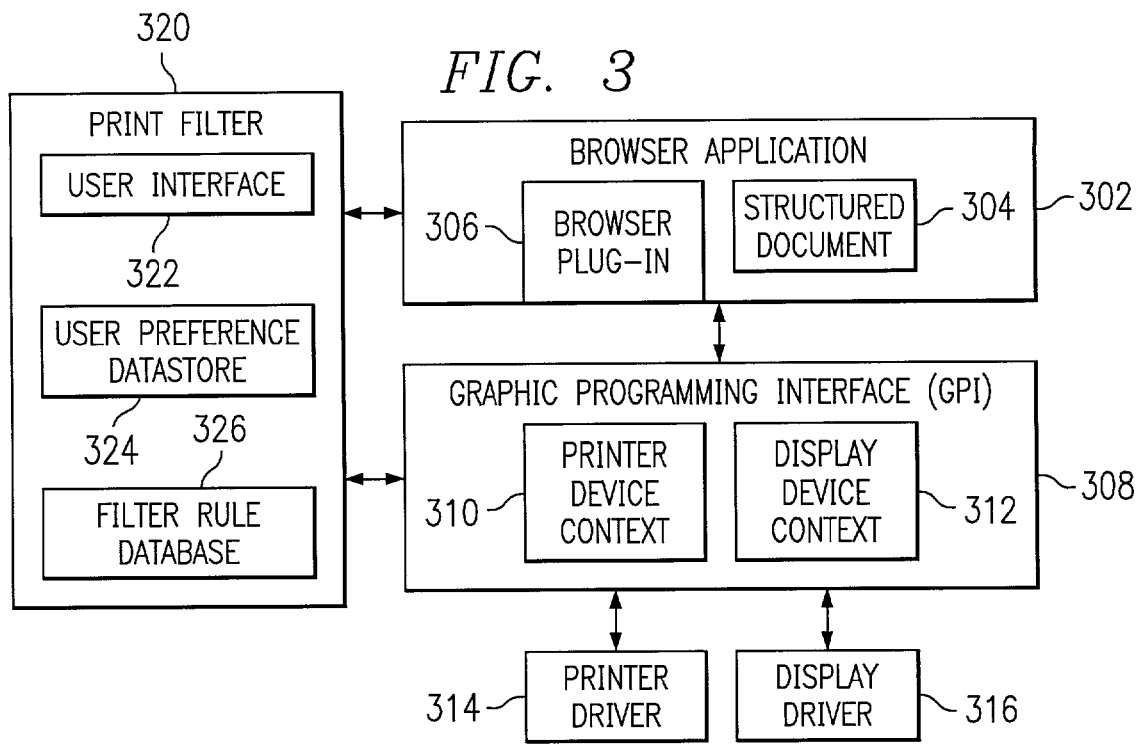
FIG. 3 is a block diagram depicting a software architecture including a print filter that interfaces with a browser application in accordance with the present invention.

With reference now to FIG. 3, a block diagram depicts a software architecture including a print filter that interfaces with a browser application in accordance with the present invention. In a manner similar to that shown in FIG. 2A, browser application 302 on a client machine retrieves structured document 304 from a Web server at the request of a user of the browser application; browser plug-in 306 may be required to render objects of a specific type within a browser window. GPI 308 supports printer device context 310 and display device context 312. Printer driver 314 uses printer device context 310 to obtain information to be forwarded to the printer, while display driver 316 uses display device context 312 to obtain information to be forwarded to the computer monitor.

In FIG. 2B, filter module 256 dynamically filters a content stream to the client browser; the browser then displays the content of a document, such as a Web page, after receiving the content through the intermediate filter module. In contrast with FIG. 2B, FIG. 3 includes print filter 320, which performs some conceptually similar filtering operations but that operates within the client machine in a different capacity. Although a filter module similar to filter module 256 could be present within the runtime environment, it is not necessary. In the present invention, the browser has already downloaded or retrieved the content associated with a particular document, most likely in response to a specific user request to view a Web page identified by a Uniform Resource Locator (URL), or more generally, a Uniform Resource Identifier (URI). Print filter 320 is activated in response to a user request to print the document that has already been retrieved from a Web server and is being viewed by the user within a browser application window.

User interface 322 allows a user to set print options/parameters, stored as user preferences 324, within print filter 320. When the user requests to print a document from within the browser application, print filter 320 is activated in an appropriate manner to apply the predetermined user preferences to the document prior to allowing the document to be printed. Print filter 320 also contains filter rule database 326 for configuring the manner in which the print filter determines a filtering action to be applied against a document that is being printed.

Print filter 320 may gain access to the runtime environment containing the document that is being printed in a variety of manners that depends upon the implementation of the invention and the operational environment of the browser application, the operating system, etc. For example, print filter 320 may be implemented as a browser plug-in that installs a special user interface button on a toolbar within the browser for printing documents in an abbreviated fashion that conserves the use of physical resources. The user would then have the option of selecting two different print buttons for printing a document: a standard browser button for printing the document in a normal fashion; and a special button that invokes the functionality of the print filter. Alternatively, print filter 320 can be installed by registering special callback routines with the browser or the operating system such that the print filter is invoked upon selection of the standard print button within the browser.

As another example, assuming that the browser application and operating system support a Java runtime environment, print filter 320 may be installed as a third-party print service using the Java Unified Printing Model. The Java Unified Printing Model provides APIs for creating and dispatching print jobs and GUI components for presenting print features to users. By having access to the Java Print Service API, print filter 320 could either implement its own complete print service or could access and alter a print job specification that is generated by the browser application. More information about printing within a Java environment can be found at http://java.sun.com.

As another example, print filter 320 might be implemented as a set of objects to operate within an open source browser, such as the open source browser being developed by The Mozilla Project. This open source browser incorporates a set of technologies in a platform-independent API that allow a collection of functional facilities to cooperate through a shared model of their environment—the Application Object Model (AOM). By having access to common objects used by the browser, print filter 320 could be integrated with the browser to generate its own print job specifications. More information about open source browser technologies can be found at http://www.mozilla.org.

As noted above, print filter 320 can be integrated with the runtime environment of a browser application in many different ways in order to intercept a print job, to gain access to the data structures associated with a document that is being printed, etc., as necessary for the particular environment in which the present invention is being implemented. After ensuring access to the document on which the print filter is to be applied, the print filter must be able to interpret the document properly. If a browser is viewing a document that requires a plug-in to interpret and render a proprietary format, the present invention may be unable to perform any type of filter operation on the document in order to reduce the consumption of resources when it is printed.

In general, however, the present invention is also able to take advantage of the standard manner in which Web-related documents are formatted. Print filter 320 is able to interpret the content of a document that is being printed because most documents that are viewed within browser applications are structured using well-known formats. While most Web pages are coded with markup language tags using HTML or XML, these languages conform to the more general Document Object Model (DOM), which is a language-neutral and platform-independent interface that allows programs and scripts to dynamically access and update the content, structure, and style of documents. For example, the Mozilla open source browser is designed to operate with documents that are formatted according to the Document Object Model. More information about the Document Object Model can be obtained from the World Wide Web Consortium (W3C) DOM Working Group (WG) at http://www.w3.org. The manner in which print filter 320 scans and modifies a document is explained below in more detail with reference to an example.

Figure 4:
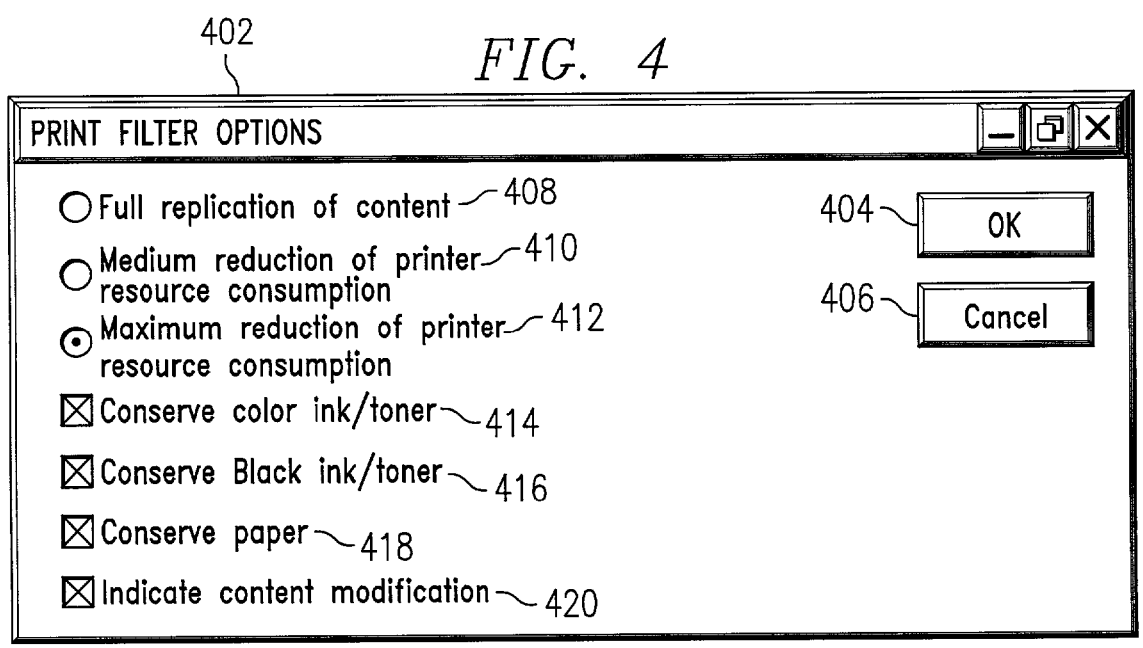
FIG. 4 is a diagram depicting a dialog window for obtaining user preferences to be used by a print filter module in accordance with a preferred embodiment of the present invention.

With reference now to FIG. 4, a diagram depicts a dialog window for obtaining user preferences to be used by a print filter module in accordance with a preferred embodiment of the present invention. In response to a user activating the user interface of the print filter, window 402 is presented on a computer display. Button 404 allows the user to save the designated print options, while button 406 allows the user to exit the dialog without saving/updating user preferences.

Radio buttons 408-412 allow a user to select the level of filtering to be performed on a document in order to reduce the consumption of physical resources during the printing process in response to a user requesting a hardcopy of a document. Radio button 408 would override all other user choices such that the print filter performs no modifications to the document that the user might print. Radio buttons 410 and 412 set a medium level and a maximum level, respectively, of reduction in the physical resources that might be consumed during a printer process.

In conjunction with a selection of either radio button 410 or 412, checkboxes 414-418 allow a user to emphasize the reduction of consumption of a particular physical resource: checkbox 414 indicates a user choice to conserve color ink/toner; checkbox 416 indicates a user choice to conserve black ink/toner; and checkbox 418 indicates a user choice to conserve paper. Checkbox 420 allows a user to choose a preference that any modification to the content of a document by the print filter should be indicated in some manner on a hardcopy. Window 402 could also include text entry fields or lists for specifying Uniform Resource Identifiers (URIs) to be filtered by the print filter, as explained in more detail below.

The user may activate the user interface of the print filter, such as the dialog window shown in FIG. 4, in a variety of manners that may depend upon the software environment of the client computer. For example, when the print filter is installed, a special menu item may also be installed within the browser application, e.g., within a "Page" menu, a "File" menu, or a "Preferences" menu; the user then selects the menu item to open the dialog box and configure the print filter options. Alternatively, a special button may be installed within a "Page Setup" dialog window or a main "Print" dialog window of the browser application, which usually allows the user to choose the number of copies to be printed, etc. The user could select the special button, which then opens the dialog box for the print filter options. The manner in which the user-configurable print filter options are specified is not intended to be limited to the examples provided above.

Figure 5A:
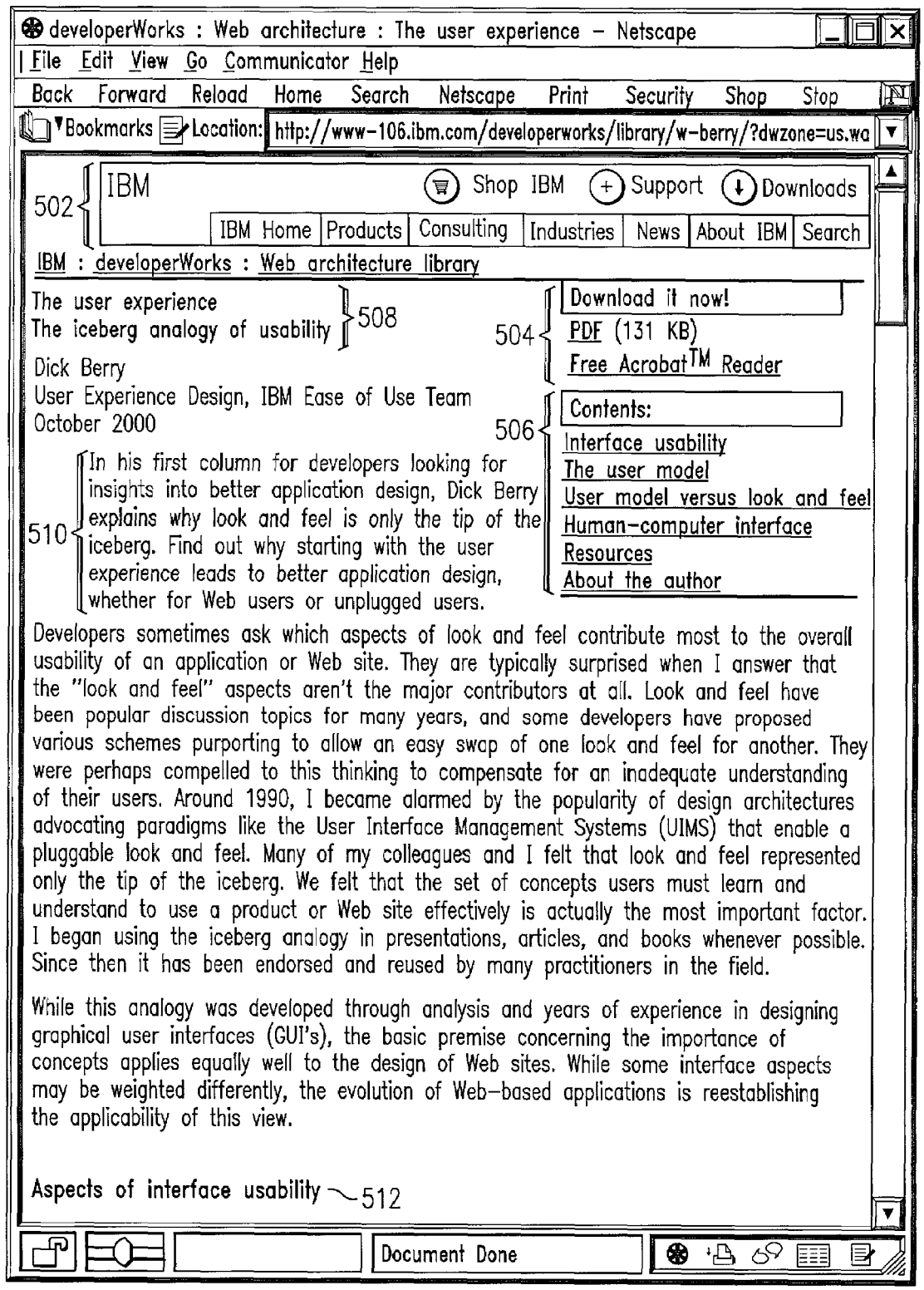
FIG. 5A is an example of a typical Web page within a browser window.

With reference now to FIG. 5A, an example of a typical Web page is shown within a browser window. The displayed Web page contains several different document elements that are formatted with different attributes, such as color, font size, font typeface, font attributes, background colors, hyperlink references, etc. Navigation bar 502 allows a user to perform several different actions, such as navigating to different areas of a Web site or initiating a search. Table 504 provides a hyperlink that allows a user to download a different version of the Web page as a native format document in a manner previously described above. Table 506 contains hyperlinks that allow a user to navigate the Web page by jumping to different sections of the Web page.

Text 508 contains the main header of the Web page, whereas text 510 is an indented paragraph that has been formatted using a "BLOCKQUOTE" tag in HTML, which separates a portion of text from other portions of text by indenting the tagged portion using wide margins. Text 512 is a subheader that marks the beginning of a section of the document.

With reference now to FIG. 5B, a diagram depicts a modified structured document that has been generated by a print filter using user-configured print options in accordance with the present invention. Text 550 shown in FIG. 5B represents a hardcopy document that has been printed after pre-print processing of a softcopy document, such as the Web page shown in FIG. 5A, using the print filter of the present invention.

The most noticeable change in the versions of the Web page shown in FIG. 5A and FIG. 5B is the removal of tables 502, 504, and 506 that were present in FIG. 5A. Since the tables occupied a significant amount of space within the document, removing these tables allows the space to be used by text. Moreover, since the tables incorporated color elements (not shown in the figure), the removal of the tables reduces the use of toner or ink.

Text 552 shows that the style applied to the text of the main header has been changed. Similarly, the style change has been applied to the subheaders represented by text lines 554 and 556. In this instance, the printer filter modified the document while parsing the document by recognizing the use of a pair of "STRONG" tags and removing the pairs of tags. Using a smaller typeface without a bold effect requires less print toner or ink. In other cases, the print filter may transcode, i.e. translate and replace, a first tag or a first set of tags with a second tag or a second set of tags, or the print filter may modify an attribute within a tag.

Text 552 has also shows that line breaks can be eliminated to reduce space. In accordance with a user-selected preference to indicate changes in content between a viewed document and a printer version of the same document, each location in which a line break has been eliminated is denoted by a character string, such as "//". Although the missing indicators are shown as character strings, the form of any indicators may vary depending upon the implementation and could include small icons or graphics.

Other techniques may be used to reduce presentation space. Multiple elements, such as multiple paragraph elements, could be combined. As another example, text within paragraphs can be truncated after a certain length. In FIG. 5B, any paragraph over three sentences has been truncated, as noted by reference numeral 558 at each location. Again, in accordance with a user-selected preference to indicate changes in content between a viewed document and a printer version of the same document, each location in which a paragraph has been truncated is denoted by a character string, such as "*****". A user may be provided with another print filter option to select a user-configurable amount of text so that the print filter reduces the amount of text within a paragraph to a value under a maximum threshold.

The first paragraph of text on the page does not have three sentences because the print filter recognized the HTML "BLOCKQUOTE" element within the document and applied a different rule than the rule applied to the normal HTML paragraphs that are tagged with the "P" tag. In this instance, the print filter has deleted all of the text within the block quote except for the first four words, and the missing text is again denoted by a character string, as noted by reference numeral 560. To save more presentation space, thereby reducing the consumption of paper for the hardcopy version of the document, the print filter can reduce the margins of each sheet of paper, as shown by spaces 562 and 564.

In addition, figures can be deleted, as shown by missing figure indicator 566. Deletion of figures not only saves space but also conserves a relatively large amount of printer toner or ink because a graphic object occupies a majority of its space with filled regions and lines. A user may be provided with another print filter option to select a user-configurable graphic size such that the print filter eliminates graphics over a maximum size.

The print filter of the present invention may employ a variety of complex rules against any structured document. For example, graphics that are referenced with URIs within the same domain as the main document that contains the references might be printed, but graphics from other domains, such as third party domains, might be filtered out. This technique is particularly useful for excluding graphical advertisements from other Web sites. Also, as noted above, a user may enter a list of URIs as part of the user-configurable options, and any hypertext reference to a specified URI can be deleted or otherwise modified by the print filter.

With reference now to FIG. 6, a flowchart depicts a process by which a print filter module generates a hardcopy version of a structured document with content that has been modified from the original version of the structured document so as to consume less physical resources during the printing process than a hardcopy version of the original document. It is assumed that the computer user has previously configured user-specifiable options to be used by the print filter of the present invention in a manner similar to the dialog window shown in FIG. 4. Again, the user may request to configure the print options in a variety of manners that may depend upon the software environment of the client computer. The user has also operated a browser application to download or retrieve a particular document file, most likely in response to a specific user request to view a Web page identified by a Uniform Resource Locator (URL), or more generally, a Uniform Resource Identifier (URI). Hence, the process within the flowchart begins with the user viewing a structured document within the browser application in a well-known manner (step 602).

At some point in time, the user may desire to generate an abbreviated hardcopy of a document that is being viewed within a browser window. The user selects an appropriate GUI control to initiate the print process (step 604), which invokes the print filter of the present invention in an appropriate manner (step 606).

After obtaining a reference to the document that the user desires to print, e.g., by obtaining a reference to a DOM data structure through an appropriate API (step 608), the print filter parses the document element by element (step 610). As each element is detected, the print filter module applies an appropriate filter rule to the element based on the type of element, its attributes, the relationship of the element to other elements, the print filter options selected by the user, and other possible considerations (step 612). In some cases, a processed element may be removed from the modified copy; in other cases, an element may be transcoded or its associated attributes may be altered. In either case, new or modified elements are generated for placement within the modified version of the document (step 614).

The print filter module may generate a copy of the original, softcopy version of the document and then parse and modify the copy, or alternatively, the print filter module may parse the original, softcopy version of the document while simultaneously generated a modified, softcopy version of the original document. In either case, the print filter module eventually generates a modified copy of the original document element by element (step 616) in a manner that does not disrupt the original document that the user is probably still viewing. Preferably, the print filter performs its processing as a background process such that the user is not impeded in using the client computer.

The print filter then prints the modified softcopy (step 618), which may be accomplished in a manner similar to the process initiated by the browser application prior to the print filter intercepting the print job, e.g., by invoking the appropriate operating system modules and associated print driver. The process of generating an abbreviated, hardcopy version of the original document is then complete.

The advantages of the present invention should be apparent in view of the detailed description of the invention that is provided above. A user operates a browser application in a normal manner to download and view a structured document, including referenced graphic objects and elements. For example, a browser is used to view a Web page formatted with HTML tags. At some point in time, the user may desire to print the Web page from within the browser application. In the prior art, the user may alter the manner in which the document is printed by choosing one or more print options, such as: printing a document in draft mode; printing a document without graphic objects; or printing a document in a manner that saves printer toner.

In contrast, the present invention allows a user to choose one or more print options in order to conserve the consumption of physical resources, such as paper and printer ink, by modifying the content of a document. By parsing the document and changing the structure, tags, elements, element attribute values, text, graphics, etc., of the document, the present invention creates a modified document that consumes less physical resources during the physical printing process than would the physical printing process of the unmodified document. Although the resulting hardcopy may be only a roughly approximate version of the original document, the user obtains representative hardcopies for particular purposes while minimizing the printing costs, thereby potentially saving significant amounts of paper and/or printer ink or printer toner.

In general, a particular type of printer generally requires a specific printer driver, which is typically provided by the manufacturer of the printer and installed on a computer system when the printer is attached to the computer system. In most cases in the prior art, the user's only ability to alter the generation of a hardcopy of a document is present within the printer driver via printer options such as a "Draft" mode. Printer manufacturers generate much more profit from selling printing supplies than from selling printers, which follows a well-known business strategy of "giving away razors while selling the blades". As a result, printer manufacturers have little incentive in providing solutions that reduce consumption of printing supplies.

Moreover, as noted above, a logical division exists between the duties of a printer driver and an application for which the printer driver prints a document. Printer drivers are concerned with initiating a print job for a hardcopy of a document, whereas applications are concerned with presenting and possibly modifying an electronic version of a document and then requesting the printing of a hardcopy version of the document. Hence, printer manufacturers are somewhat constrained in the manner in which they could supply a software solution that reduces consumption of printing supplies.

The present invention recognizes that Web-based documents are generally printed for specific, limited purposes and that hardcopy versions of Web-based documents can be relatively expensive. By utilizing the extensible nature of browser applications and the standard formatting of structured documents on the World Wide Web, the present invention is able to provide a solution for reducing the consumption of printing supplies in order to reduce printing costs of relatively expensive printouts of Web-based documents.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disk, hard disk drive, RAM, and CD-ROMs.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method of processing a structured document in an application, where the structured document comprises one or more elements, the method comprising:

configuring a print option, wherein the print option comprises one or more user-configurable print parameters that indicate a user preference with respect to reducing consumption of one or more physical resources during printing of the structured document by modifying the content of the structured document to remove one or more of the elements prior to printing;

receiving a print request to print a hardcopy of the structured document being displayed within a browser window;

in response to receiving the print request, detecting the print option;

in response to detecting the print option, generating a modified copy of the structured document for printing in accordance with the user-configurable print parameters by modifying the content of the structured document to remove one or more of the elements in accordance with the print option by filtering the structured document for printing to remove an element associated with a first Uniform Resource Identifier (URI) that is not located within a domain identified by a second URI by which the structured document was retrieved prior to being displayed within the browser window; and printing the hardcopy of the modified structured document.

2. The method of claim 1 where configuring a print option comprises setting a user-configurable print parameter that indicates a user preference to remove one or more elements from the structured document in response to the print request.

3. The method of claim 1 where configuring a print option comprises setting a user-configurable print parameter that indicates a user preference to remove a user-configurable amount of text from the structured document in response to the print request.

4. The method of claim 1 where configuring a print option comprises setting a user-configurable print parameter that indicates a user preference to include one or more additional elements in the modified structured document to indicate that the content of the structured document has been modified to remove one or more elements in response to the print request.

5. The method of claim 1 where generating a modified copy of the structured document for printing comprises filtering the structured document for printing to delete one or more elements of a specified type.

6. The method of claim 1 where generating a modified copy of the structured document for printing comprises filtering the structured document for printing to delete text within an element that is determined to be larger than a configurable maximum amount of text.

7. An apparatus for processing a structured document in an application, where the structured document comprises one or more elements, the apparatus comprising:

configuring means for configuring a print option, wherein the print option comprises one or more user-configurable print parameters that indicate a user preference with respect to reducing consumption of one or more physical resources during printing of the structured document by modifying the content of the structured document to remove one or more of the elements prior to printing;

receiving means for receiving a print request to print a hardcopy of the structured document being displayed within a browser window;

detecting means for detecting the print option in response to receiving the print request;

generating means for generating a modified copy of the structured document for printing in accordance with the user-configurable print parameters by modifying the content of the structured document to remove one or more of the elements in accordance with the print option by filtering the structured document for printing to remove an element associated with a first Uniform Resource Identifier (URI) that is not located within a domain identified by a second URI by which the structured document was retrieved prior to being displayed within the browser window; and printing means for printing the hardcopy of the modified structured document.

8. The apparatus of claim 7 where the configuring means comprises a first setting means for setting a user-configurable print parameter that indicates a user preference to remove one or more elements from the structured document in response to the print request.

9. The apparatus of claim 7 where the configuring means comprises a first setting means for setting a user-configurable print parameter that indicates a user preference to remove a user-configurable amount of text from the structured document in response to the print request.

10. The apparatus of claim 7 where the configuring means comprises a first setting means for setting a user-configurable print parameter that indicates a user preference to include one or more additional elements in the modified structured document to indicate that the content of the structured document has been modified to remove one or more elements in response to the print request.

11. The apparatus of claim 7 where the generating means comprises a means for filtering the structured document for printing to delete one or more elements of a specified type.

12. The apparatus of claim 7 where the generating means comprises a means for filtering the structured document for printing to delete text within an element that is determined to be larger than a configurable maximum amount of text.

13. A computer program product in a computer readable medium for use in a data processing system for processing a structured document comprising one or more elements, the computer program product comprising:

instructions for configuring a print option, wherein the print option comprises one or more user-configurable print parameters that indicate a user preference with respect to reducing consumption of one or more physical resources during printing of the structured document by modifying the content of the structured document to remove one or more of the elements prior to printing;

instructions for receiving a print request to print a hardcopy of the structured document being displayed within a browser window;

instructions for detecting the print option in response to receiving the print request;

instructions for generating a modified copy of the structured document for printing in accordance with the user-configurable print parameters by modifying the content of the structured document to remove one or more of the elements in accordance with the print option;

instructions for filtering the structured document for printing to remove an element associated with a first Uniform Resource Identifier (URI) that is not located within a domain identified by a second URI by which the structured document was retrieved prior to being displayed within the browser window; and instructions for printing the hardcopy of the modified structured document.

14. The computer program product of claim 13 further comprising:

instructions for setting a user-configurable print parameter that indicates a user preference to remove one or more elements from the structured document in response to the print request.

15. The computer program product of claim 13 further comprising:

instructions for setting a user-configurable print parameter that indicates a user preference to remove a user-configurable amount of text from the structured document in response to the print request.

16. The computer program product of claim 13 further comprising:

instructions for setting a user-configurable print parameter that indicates a user preference to include one or more additional elements in the modified structured document to indicate that the content of the structured document has been modified to remove one or more elements in response to the print request.

17. The computer program product of claim 13 further comprising:

instructions for filtering the structured document for printing to delete one or more elements of a specified type.

* * * * *

UNITED STATES PATENT AND TRADEMARK OFFICE
CERTIFICATE OF CORRECTION

PATENT NO. : 7,617,446 B2  Page 1 of 1
APPLICATION NO. : 09/817090
DATED : November 10, 2009
INVENTOR(S) : Rabindranath Dutta It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2258 days.

Signed and Sealed this

Nineteenth Day of October, 2010

David J. Kappos
*Director of the United States Patent and Trademark Office*